United States Patent Office 3,345,344
Patented Oct. 3, 1967

3,345,344
PROCESS FOR CONVERSION OF AMIDOXIME POLYMERS TO POLYHYDROXAMIC ACIDS USING AQUEOUS HYDROCHLORIC ACID SOLUTIONS
Charles A. Fetscher, Short Hills, and Stanley A. Lipowski, Livingston, N.J., assignors to Nopco Chemical Company, Newark, N.J., a corporation of New Jersey
No Drawing, Filed Sept. 8, 1961, Ser. No. 136,748
3 Claims. (Cl. 260—78.4)

The present invention relates to a new class of solid chelating and ion exchange agents. More particularly, the present invention relates to polyhydroxamic acids as well as to a procedure for preparing same.

We have discovered that high molecular weight polyamidoximes in which substantially all of the amidoxime groups have been converted to hydroxamic acid groups are outstanding chelators and ion exchangers. We have also discovered that by treating high molecular weight polyamidoximes with hydrochloric acid in the cold, substantially complete conversion to polyhydroxamic acid is achieved.

It is known to prepare polyamidoximes and to employ same for extracting certain heavy metals from solutions containing same. See U.S. application Ser. No. 673,157, Fetscher, filed July 22, 1957, now abandoned, and copending U.S. applications Ser. No. 815,245, now Patent No. 3,088,798, Fetscher, and 815,246, Fetscher, now Patent No. 3,088,799 both filed May 25, 1959. It is also known to prepare ion-exchange resins and to employ same for exchanging certain ions. It is also known to prepare monomeric hydroxamic acids and that said acids form color complexes with certain metals. See Chem. Rev. 33, 209. Also, the partial conversion of amidoxime groups to hydroxamic acid groups in polyacrylamidoximes is claimed. See Schouteden, Makromolekulare Chemie XXVII: 246–255 (July 1958).

However, it was most unexpected to find that by our process we could obtain substantially complete conversion of polyamidoxime groups to polyhydroxamic groups with little or no loss of oxime nitrogen. The attempts heretofore made as shown by Schouteden involved treatment with hot acid. For instance, Schouteden points out that treatment with hot 4 N hydrochloric acid (about 14.4%) leads to formation of a mixture of products including carboxylic acids. Such treatment drastically reduces the oxime nitrogen content of the material so treated. In fact, the standard method of determining oxime nitrogen present in amidoximes as well as in hydroxamic acids is to split off the oxime group with hot sulfuric acid. It was therefore most unexpected to find that cold hydrochloric acid will split off the amide nitrogen in an amidoxime and leave the oxime group intact. This is also unexpected for the additional reason that cold sulfuric acid, even a 50% solution, does not appear to change the material at all.

The fact that these polyhydroxamic acids are able to extract from a solution and form extremely stable complexes with heavy metals is surprising. They cannot saturate the co-ordination sphere of a heavy metal because of their limited mobility, although it may happen to a limited degree under some special conditions. The reason is that most heavy metals show co-ordination numbers of six, a few have values of four and a few have eight. Considering co-ordination numbers of six as typical and realizing that the values of four and eight represent only differences in degree, three bidentate chelating entities are required to fill the co-ordination sphere of the heavy metal. The hydroxamic acid moiety per se is bidentate although, of course, the polymer molecule as a whole is multidentate. However, the chelating groups on the polymer are randomly separated, and it is most improbable that the relatively rigid molecules of the solid can curl and encompass the metal in order to saturate all of its co-ordination sphere. Thus, solid bidentate chelating agents can in general occupy only two sites in the co-ordination sphere of the metal. It is true that unsaturated complexes are known; however, they would be expected to be considerably less stable than complexes in which one or several molecules of the chelating agent completely saturate the co-ordination sphere of the metal. Saturation tends to happen whenever possible.

Hence, it is surprising that these or any other insoluble polymeric materials can be useful chelating agents. However, we have found that polyhydroxamic acids in the form of, for instance, granules or fibers, are very strong chelating agents for a number of heavy metals. That is, they strongly chelate these metals down to a very low pH. Furthermore, the polyhydroxamic acids are unique in being broad range ion exchange materials and at the same time selective chelating agents. Thus, the polyhydroxamic acids or the sodium salt will exchange the hydrogen or sodium ion for calcium, barium, aluminum, etc., in typical ion exchange reactions. The acid or the salt will also selectively extract iron, copper, gold, uranium, thorium, and a number of other heavy metals from solutions rich in the lighter cations. The polyhydroxamic acids form stable complexes with the heavy metals which overcome the tendency to form simple salts. The complexes are strongly colored, while the salts are generally white or light tan.

The polyhydroxamic acids utilized in the present invention can be prepared in a direct and economical manner by hydrolyzing polyamidoximes with relatively cold hydrochloric acid. The hydrochloric acid is used as an aqueous solution varying from 15% by weight of hydrochloric acid up to full concentration, i.e., 37% by weight. The temperature of the hydrochloric acid solution during the conversion of the amidoxime substituents to hydroxamic acid substituents should not exceed about 35° C. The stronger the hydrochloric acid solution, the shorter is the time of treatment and the lower is the temperature of the hydrochloric acid solution. In general, depending on acid strength, conversion is complete in from a few seconds to an hour. The preparation of our polyhydroxamic acids is disclosed in copending application Ser. No. 83,911, Fetscher, Jan. 23, 1961, now Patent No. 3,154,499.

The polyamidoximes can also be prepared in a direct and economical manner. Their preparation is based upon the reaction of a nitrile containing polymer with hydroxylamine at temperatures of between 0° C. and 100° C. for from about ¼ to 40 hours, in a solvent for hydroxylamine. Solvents such as water and alcohols, e.g., methanol, ethanol, or propanol, are satisfactory. Hydroxylamine, as is well known in the art, is commercially available only in the form of its salts such as hydroxylamine sulfate and hydroxylamine hydrochloride. Hence, it is necessary to neutralize a solution of the salt to a pH of about 7.5 in order to utilize the free base. It is only the free base which reacts with the nitrile substituents. Examples of preparations of polyamidoximes, from which we obtain polyhydroxamic acids can be found in the four applications referred to above as well as in Belgian Patent No. 541,496.

There are a great many types of nitrile containing resins or polymers which can be used in the present invention to serve as starting materials for the preparation of polyamidoximes which are then converted to polyhydroxamic acids by our new process. For example, the largest and most economically feasible group comprise the homopolymers and copolymers of acrylonitrile. In the copolymers, the comonomer may be one or more of the common ethylenically unsaturated monomers copolymerizable therewith such as styrene, butadiene, vinyl chloride, etc., including all the monomers which will copolymerize with acrylonitrile. A representative list appears on page 50 of the book "The Chemistry of Acrylonitrile" by the American Cyanamid Company (1951). The nitrile content essential for the formation of the amidoxime group can arise from other sources beside acrylonitrile. Polymer containing alpha-methacrylonitrile, alpha-ethacrylonitrile, fumaryl dinitrile or vinylidene cyanide or the like are perfectly atisfactory. It is only necessary that the homopolymer or copolymer be water insoluble and resistant to the strong acid treatment herein described. It is preferred that the polymer contain at least about 10% by weight of nitrile for optimum effectiveness. Note that 10% by weight of nitrile (CN) is about 20% by weight of nitrile calculated as acrylonitrile. This means that in the case of copolymers of acrylontirile, the non-nitrile comonomers, one or several, can total as much as 80% by weight of the final resin weight. Since the homopolymer is completely satisfactory, the comonomer content obviously can be zero. Thus, the composition of the resinous nitrile substrate can be from about 20% to 100% by weight of acrylonitrile or an equivalent weight of another nitrile containing monomer, e.g., alpha-methacrylonitrile, and 80% to 0% of one or more comonomers. By "copolymer" we mean polymers obtained from the polymerization of acrylonitrile or other nitrile containing monomers with at least one other monomer copolymerizable therewith. Depending upon the process of polymerization, the copolymer may be characterized as random, alternating, graft or block copolymer. The term polymer as used herein includes both homopolymers and copolymers.

In general, the molecular weights of the polymers from which the polyhydroxamic acid is prepared is in no way critical. They merely have to be high enough in molecular weight to be substantially insoluble in water and there is no upper limit. The commercially available acrylonitrile homopolymers and copolymers are all completely satisfactory. A particularly preferred class of materials are polymers and copolymers of acrylonitrile in fiber form. The commercially available so-called "acrylic" fibers in the form of fibers, yarns, woven and non-woven fabrics, etc. are eminently satisfactory.

An additional type of nitrile containing polymer is the natural or synthetic polymer to which acrylonitrile has been added as a side chain on the polymer. It is, of course, necessary that the material be resistant to the strong acid employed in converting the amidoxime groups to the hydroxamic acid groups. For example, properly insolubilized polyvinyl alcohol which has been cyanoethylated to the extent of about 10% nitrile would be a satisfactory starting resin.

It must be appreciated that generally not all of the nitrile substituents can be converted to amidoxime substituents which, in turn are converted to hydroxamic acid substituents by our process. The nitrile substituents present in the inner portions of the resin are not exposed to the hydroxylamine reactant. The extent of this conversion, as indicated by the quantity of hydroxylamine consumed, appears to range from about 20% to 75%. This means that a 100% polyacrylonitrile resin is converted to a polyamidoxime containing from about 19.8% to about 57% by weight of amidoxime substituent,

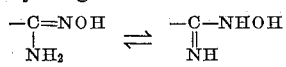

calculated as such, based upon the total weight of the resin.

Thus, we can make use of polyamidoximes, for subsequent conversion to polyhydroxamic acids, containing from 8.5% to 57% by weight of amidoxime substituents. However, materials somewhat lower or somewhat higher in amidoxime content can be prepared and used. Hence, material containing as little as 5.0% or even considerably less, or as much as 60% by weight of amidoxime substituents, depending upon the nature of the polymer, are useful in preparing polyhydroxamic acids. To assure a material which is not appreciably acid sensitive during the conversion to a polyhydroxamic acid its use and regeneration, an amidoxime content of about 5.0% to about 25% by weight is preferred. Of course, if a cross-linked polymer is used, then material containing up to about 60% by weight of amidoxime substituents may be used in contact with acids without fear of acid sensitivity.

The conversion of the polyamidoxime substituents to polyhydroxamic acid substituents is substantially complete when our procedure is used. This means that a 100% polyacrylonitrile resin which is converted to a polyamidoxime containing from about 19.8% to about 57% by weight of amidoxime substituents can be converted to a polyhydroxamic acid containing from about 20.1% to about 58% by weight of polyhydroxamic acid substituents,

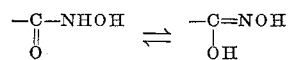

calculated as such, based on the total weight of the resin. Thus, from polyamidoximes, which as indicated above, contain from about 5.0% to about 60% by weight of amidoxime substituents, depending upon the nature of the polymer, we can obtain polyhydroxamic acids containing from about 5.1% to about 61% by weight of hydroxamic acid substituents. To assure a material which is not appreciably acid sensitive during its conversion and use, an amidoxime content of about 5.0% to about 25% by weight is preferred which means that the polyhydroxamic acid obtained from same will contain from about 5.1% to about 25.5% by weight of hydroxamic acid substituents. Therefore, since the "molecular" weights of the amidoxime and hydroxamic acid substituents are 59 and 60 respectively, i.e., they differ by only one unit,

7494

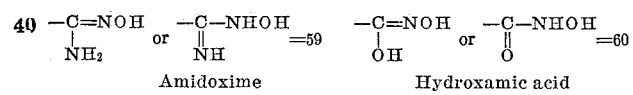

Amidoxime           Hydroxamic acid the percent of hydroxamic acid substituents present in the material can, for all practical purposes, be expressed by the same percents used to express the percent amidoxime which is in the material.

There are many examples of the resinous materials described above which are available in fibrous form to serve as a substrate for preparing our polyhydroxamic acids. Several so-called acrylic fibers are available in commercial or semi-commercial scale. These are all, save one, based upon acrylonitrile. The exception is based upon vinylidene cyanide and is a perfectly satisfactory alternative. The fibers listed below are all satisfactory for conversion to fibrous polyamidoximes and subsequent conversion to polyhydroxamic acids.

| Fiber | Manufacturer | Composition |
| --- | --- | --- |
| Orlon | Du Pont de Nemours | 90% Acrylonitrile. |
| Acrilan | Chemstrand | Do. |
| Creslan | American Cyanamid | 95-96% Acrylonitrile. |
| Zefran | Dow Chemical Co | 90% Acrylonitrile. |
| Verel | Tennessee Eastman | About 50% acrylonitrile. |
| Dynel | Carbide & Carbon Chem | 40% Acrylonitrile-60% Vinyl chloride. |
| Darlan | B. F. Goodrich | 50 Mole percent Vinylidene cyanide-50 Mole percent Vinyl acetate. |

The detailed compositions of a few additional and typical acrylonitrile polymers which are satisfactory for the production of the polyamidoximes and subsequent conversion to polyhydroxamic acids are listed below. The figures are the percents by weight of each monomer in the polymer.

90% acrylonitrile–10% vinylacetonitrile
50% acrylonitrile–50% methacrylonitrile
97% acrylonitrile–3% vinyl acetate
50% acrylonitrile–50% vinyl acetate
95% acrylonitrile–5% methyl methacrylate
65% acrylonitrile–35% methyl acrylate
45% acrylonitrile–10% methyl acrylate–45% vinyl acetate
44% acrylonitrile–44% vinyl chloride–12% methyl acrylate
93% acrylonitrile–7% 2-vinyl pyridine
26% acrylonitrile–74% butadiene
40% acrylonitrile–60% butadiene
33% acrylonitrile–67% styrene
100% acrylonitrile Analytical proof that the conversion from polyamidoxime to polyhydroxamic acid is essentially complete is quite difficult because the measurable oxime content is approximately the same for each material. The total nitrogen is more revealing, but is complicated by the residual nitrile content. However, the following proof was developed and is described in connection with the following example.

EXAMPLE I

A. *Preparation and analysis of polyamidoxime*

80 parts by weight of polyacrylonitrile of molecular weight of about 130,000 in the form of very fine powder (—300 mesh) was suspended in a solution of 300 parts by weight of hydroxylammonium sulfate, 140 parts by weight of sodium hydroxide and 2500 parts by weight of deionized water. The pH of the solution was 7.6. The mixture was heated to 90° C. and held at that temperature for 12 hours, all of the time under vigorous agitation. It was cooled to 35° C. and the product filtered off and washed repeatedly with deionized water. The resin remained insoluble throughout the reaction, but was softened somewhat by the chemical and heat. This caused it to grow from a very fine powder to small clusters of 10 to 20 mesh. The product weighed 130 grams. The yield is always considerably more than theoretical because of firmly occluded salt. The product is essentially a polyamidoxime having the following reoccurring unit.

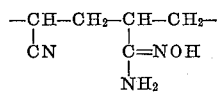

Portions of this product were then analyzed for total nitrogen and for oxime nitrogen by the well-known Dumas and Raschig methods and the following was found:

|  | Percent |
|---|---|
| Total nitrogen (Dumas method) | 22.1 |
| Oxime nitrogen (Raschig method) | 6.95 |
| Amidoxime nitrogen (twice the amount of oxime nitrogen) (calculated) | 13.9 |
| Nitrile nitrogen (difference between the total nitrogen and amidoxime nitrogen) (calculated) | 8.2 |

B. *Preparation and analysis of polyhydroxamic acid*

Another portion of this polyamidoxime was converted to the polyhydroxamic acid as follows. 20 parts by weight of the above polyamidoxime was gently stirred in 100 parts by weight of 37% hydrochloric acid at 10° C. for 5 minutes. 200 parts by weight of ice water was then added and the batch filtered and washed. The product was gelatinous, but dried in a vacuum overnight to a brittle solid. This material was also analyzed and the following was found:

|  | Percent |
|---|---|
| Total nitrogen (Dumas method) | 14.8 |
| Oxime nitrogen (Raschig method) | 6.31 |

This brief cold treatment could not hydrolyze the nitrile groups. Therefore, the nitrile nitrogen of the polyhydroxamic acid should be the same as that of the polyamidoxime, viz, 8.2%. If the reaction is complete, the oxime-nitrogen should be the difference between the total nitrogen and the nitrile nitrogen. That is

|  | Percent |
|---|---|
| Total nitrogen (found 2nd sample) | 14.8 |
| Nitrile nitrogen (calculated for 1st sample) | —8.2 |
| Oxime nitrogen (theoretical) | 6.6 |

The oxime nitrogen found, 6.31%, is very close to the calculated figure. If the reaction were incomplete, the total nitrogen found would be higher than the 14.8% above because amidoxime nitrogen is twice that of oxime nitrogen. The difference between this and the fixed nitrile nitrogen, would be higher than the 6.6% and further away from the measured 6.31%.

In our sample the found oxime nitrogen and the nitrile nitrogen add up to the measured total nitrogen, within experimental error. Thus, there is not enough nitrogen available for amide groups; and hence there cannot be more than traces of amides or amidoximes in our polyhydroxamic acids.

In connection with the analysis set forth in Example I, it must be appreciated that analyses are easier and more accurate if the quantity being measured is large. Hence, in Example I, the polyacrylonitrile was strongly converted to build up the oxime content. The 6.95% oxime nitrogen which was found in the polyamidoxime corresponds to 29.3% amidoxime. This is somewhat higher than our preferred upper limit of 25% amidoxime for an uncrosslinked resin. At 29.3% amidoxime, the resin is very close to becoming soluble in the strong acid used to convert it into polyhydroxamic acid. That is, it is very highly swollen.

Examples II through IV describe the preparation of polyhydroxamic acids from polyamidoximes utilizing our process.

EXAMPLE II

Zefran amidoxime cloth containing 3.15% by weight of oxime nitrogen (13.3% by weight amidoxime was immersed for 36 minutes in a 20% hydrochloric acid solution at a temperature of 36° C. The cloth was thereafter washed several times with water and air dried. The oxime nitrogen content of the resulting hydroxamic acid cloth was found to be 2.93% (12.55% by weight hydroxamic acid).

EXAMPLE III

Zefran amidoxime cloth containing 4.02% by weight of oxime nitrogen (16.95% by weight amidoxime) was immersed for five minutes in a 37% hydrochloric acid solution at 20° C., washed thoroughly with water and air dried. The fabric now showed the characteristic colors in its chelates of a polyhydroxamic acid chelate. The cloth was not physically changed and retained its original strength. The oxime nitrogen content of the resulting hydroxamic acid cloth was 3.59% (15.4% by weight of hydroxamic acid).

EXAMPLE IV

Acrilan amidoxime cloth containing 3.60% by weight of oxime nitrogen (15.1% by weight of amidoxime) was immersed for 30 minutes in a 20% hydrochloric acid solution at 25° C. The chelates of this product, as above, showed the behavior of a polyhydroxamic acid. The washed and air dried cloth was white in color and strong. It retained 3.40% oxime nitrogen (14.5% by weight of hydroxamic acid).

CHELATION AND ION EXCHANGE

A. *Chelation*

Our solid polyhydroxamic acids have been found to chelate, i.e., to form complexes with certain heavy metals of atomic weight greater than 50. By bringing a solution containing one or more of the metals to be extracted into contact with our polyhydroxamic acids, we can achieve substantially complete removal of the metal. We can also remove metals from very dilute solutions, such as concentrations of $10^{-5}$ to $10^{-10}$.

During contact between the solution and the chelating agent, the hydroxamic groups and the metal react to form a complex thereby withdrawing the metal from solution. The metals can be removed from the complex and recovered if desired. Also, in most instances, the chelating agent is simultaneously regenerated during the removal of the metal. In our process, the solid chelating agents do not merely deactivate the metal, they remove it; thus, both the metal and the chelating agent can be reused again and again. The soluble chelating agents of commerce, e.g., ethylene diamine tetraacetic acid and its analogues would be extremely difficult to recover and are seldom, if ever, reused.

As is true of all known chelating agents, the efficiency of the polyhydroxamic acids as chelating agents is reduced by increasing amounts of hydrogen ion. However, the hydroxamic acid complexes are surprisingly stable to acid and most are disrupted only by strong mineral acid at a pH below 2 or even below 1. The pH at which essentially no chelation of a given metal takes place is easily determined by trial. Representative lower pH values for the successful chelation of a few metals are listed below. Of course, in these instances, those same pH values represent upper limits for eluting or freeing the metal from the polyhydroxamic acid. These are not absolute values since obviously the chelation depends upon the activity of the metal as well as that of the hydrogen ion and every detail of the system influences the activity of the various ions. For instance, various materials can be present which activate the metal so that it is easier to chelate or deactivate the metal so that it is less easy to chelate.

TABLE I

| Metal: | pH* |
|---|---|
| Gold (auric) | <1 |
| Iron (ferric) | <1 |
| Uranium (uranyl) | 1.5 |
| Thorium | 2.5 |
| Copper (cupric) | 2.0 |

*Approximate lowest value for chelation in plain water; approximate highest value for elution in plain water.

The above data were determined by chelating solutions containing 1% by weight of the metal using a polyhydroxamic acid obtained by treating Zefran amidoxime fiber with hydrochloric acid. The iron and copper were in the form of their sulfates, the gold and thorium were in the form of their chlorides and uranium was in the form of uranyl acetate.

Reduced acidity, which means fewer hydrogen ions to compete with the heavy metal, facilitates chelation of the metal. Therefore, chelation on the alkaline side is limited only by the solubility of the heavy metal salts at high pH. In general, there is little call for removing heavy metals from strongly alkaline systems since heavy metals seldom contaminate such systems. Under special conditions, such as when sequestrants are deliberately added or accidentally present, heavy metals can be held in alkaline solution. Thus, Rochelle salts will make iron quite soluble in alkaline solution. Ammonium will hold copper in alkaline solution. The polyhydroxamic acid will remove the metal in each of these cases. If it is necessary to adjust the pH, any suitable acid or base can be used. Such pH adjustment is common and known practice. Regarding elution, strong acids, i.e., 1% to 10% sulfuric or hydrochloric acid will elute most of these metals from their polyhydroxamic acid complexes. Any acid of comparable strength will serve, but the cheap acids above indicated are preferred. The complexes with a few of the noble metals are not destroyed by acid.

The temperatures employed during extraction and elution are not critical since the solid polyhydroxamic acid, whether in the form of fibers, fabrics, granules, etc., is stable up to about 125° C.; thus, we may use temperatures up to such value. Of course, lower temperatures, even down to the freezing point of the solutions may be used. In other words, the temperature of the materials which is usually room temperature has been found to be convenient. Of course, in industrial processes, the temperature of the liquid bodies to be treated may be above or below room temperature; but, as stated above, the temperatures are not critical.

In addition to aqueous media, including water as well as such commodities as beer, wines, milk, etc., our process may be carried out in non-aqueous media, e.g., methanol, ethanol, or any solvent which will dissolve traces of metal salts.

Although when we convert polyamidoximes to polyhydroxamic acids, we do not appreciably change the amount of oxime nitrogen, yet we greatly change the behavior of the material. That is, the chelation behavior and the colors of the complexes of the polyhydroxamic acid when compared with the polyamidoxime are striking and convincing proof that a new material has been formed. The retention of most of the oxime nitrogen and the loss of amidoxime character demonstrate that the product is now a polyhydroxamic acid. Moreover, the polyhydroxamic acids are cation exchangers. Hence, it is clear that we have in fact a new composition of matter. Regarding the differences in chelation, an important and conspicuous difference is the color of the resulting complexes, some of which are tabulated below. Note also that polyhydroxamic acids chelate thorium, zinc and silver whereas polyamidoximes do not.

| Metal Chelated | Color of Polyamidoxime Chelate | Color of Polyhydroxamic acid Chelate |
|---|---|---|
| Copper | Blue green | Yellow green. |
| Iron | Red brown | Cherry red. |
| Uranium | Orange | Reddish orange. |
| Gold | Golden brown | Black. |
| Thorium | No chelate formed | Lemon yellow. |
| Cobalt | Very light pink | Strong pink. |
| Zinc | No chelate formed | Yellow. |
| Silver | ...do... | Black. |

The colors of the copper and iron chelates of the two materials are distinctly different.

The following examples, viz., Examples V through X, describe chelation using our polyhydroxamic acids.

EXAMPLE V

Zefran hydroxamic acid cloth containing 4.36% by weight of oxime nitrogen (18.7% by weight hydroxamic acid) was immersed for 3 hours in a uranyl acetate solution containing 0.2% by weight of uranium. The pH was 4.7. The cloth was washed and air dried. The orange colored fabric chelated 15% uranium based on the weight of the cloth.

EXAMPLE VI

Zefran hydroxamic acid cloth containing 4.36% by weight of oxime nitrogen (18.7% by weight of hydroxamic acid) was immersed for 3 hours in a uranyl acetate solution containing 1% by weight uranium. The pH of the solution was 4.1. The cloth chelated 32% uranium based on the weight of the fabric.

EXAMPLE VII

Acrilan hydroxamic acid cloth containing 1.84% by weight of oxime nitrogen (7.9% by weight of hydroxamic acid) was immersed for 3 hours in a solution of uranyl acetate containing 1% uranium at pH of 4.1. The cloth picked up 13% uranium based on the weight of the fabric. The color of the cloth was orange.

EXAMPLE VIII

Acrilan hydroxamic acid cloth containing 4.38% by weight of oxime nitrogen (18.8% by weight hydroxamic acid) was immersed in a solution of uranyl acetate containing 1% by weight uranium for 3 hours. The pH of the solution was 4.1. The fiber picked up 16% uranium based on the weight of the cloth.

EXAMPLE IX

Zefran hydroxamic acid cloth having 4.36% by weight of oxime nitrogen (18.7% by weight hydroxamic acid) was immersed for 5 hours in a thorium chloride solution containing 1% by weight thorium. The pH of the solution was 2.5. The cloth was rinsed with water and air dried. The resulting golden yellow colored fabric chelated 11% thorium based on the weight of the cloth.

A polyamidoxime fabric treated under the same conditions developed no color and upon analysis showed only a trace (0.2%) of thorium.

EXAMPLE X

Acrilan hydroxamic acid cloth with a 1.84% by weight oxime nitrogen (7.9% by weight hydroxamic acid) content was immersed for 5 hours in a solution of thorium chloride containing 1% thorium at pH of 2.5. The cloth picked up 8% thorium based on the weight of the fabric.

The polyhydroxamic acid whether in the form of granules, fibers, yarns, woven or non-woven fabrics, etc., has many uses. A principal use is in the recovery of metals from solutions containing same. The resulting chelated polyhydroxamic acid in most instances may be eluted with acid to recover the metals. Moreover, in view of the exceedingly high capacities which may be achieved, the chelated polyhydroxamic acid may be used as such. For instance, if the solid polyhydroxamic acid is chelated, especially when used in the form of a woven fabric or non-woven bat with one or a mixture of the noble metals, for instance, about 25% to 35% by weight of a metal such as gold, based on the total weight of the complex, it will serve as a relatively light weight and flexible radiation shield. Also, the solid polyhydroxamic acid may serve as a catalyst carrier for reactions which are promoted by traces of one or a mixture of various heavy metals such as palladium, copper or nickel, in amounts of, e.g., about 1% to 5% by weight of the metal based on the total weight of the complex. In such system, the catalyst is readily removed when no longer wanted.

Also, when chelated with a single radioactive metal isotope, e.g., $U^{235}$, or a plurality of radioactive isotopes, the polyhydroxamic acid will serve as an efficient neutron source which may be used as a fuel element in a reactor. This is described in copending application Ser. No. 83,911, Fetscher, filed Jan. 23, 1961, now Patent No. 3,154,499.

B. Ion exchange

When using our polyhydroxamic acids as cation exchangers, the free acid form of the polymer is first converted to the sodium salt form. The material is then brought into contact with a solution containing the cations to be exchanged such as calcium, barium, strontium, aluminum, etc. After a few minutes the polyvalent cation has been exchanged for the sodium. The sodium ion remains in the solution and the exchanged ion is removed as the salt of the polyhydroxamic acid.

To regenerate the ion exchanger, the material, after being used, is immersed in an acid solution, e.g., a 10% by weight aqueous hydrochloric acid solution, rinsed with water to remove excess acid and then immersed in an aqueous sodium hydroxide solution and finally rinsed to remove excess alkali.

The following examples demonstrate ion-exchange utilizing our polyhydroxamic acids.

EXAMPLE XI

A. Preparation of polyhydroxamic acid sodium salt

Twenty grams of a polyamidoxime (containing 4.2% by weight oxime nitrogen, 17.7% by weight amidoxime) prepared from polyacrylonitrile resin was soaked for thirty minutes in a 20% hydrochloric acid solution at room temperature (about 25° C.). Thereafter, the resin was filtered off and washed several times with cold water. It now demonstrated the complexing behavior of a polyhydroxamic acid. Analysis showed 4.0% by weight oxime nitrogen corresponding to 17.1% hydroxamic acid. The polyhydroxamic acid was then suspended in one liter of water and neutralized with a 10% by weight aqueous sodium hydroxide solution to a pH of 7.6. The resulting sodium salt of the polyhydroxamic acid was filtered off and dried at 80° C.

B. Exchange of barium ions

A sample of the polyhydroxamic sodium salt from part A above was suspended in a dilute barium chloride solution for 10 minutes. The salt was then filtered, washed with water until no reaction with sulfuric acid showed in the filtrate. The washed polyhydroxamic acid salt which was now the barium salt, was regenerated by treatment with a strong hydrochloric acid solution. The regenerated polyhydroxamic acid was filtered off. When dilute sulfuric acid was added to the filtrate, barium sulfate precipitated. This demonstrated that the sodium salt form of the polyhydroxamic acid exchanged barium ions for sodium, the barium ions in turn being replaced by hydrogen ions upon regeneration with acid.

EXAMPLE XII

Water softening test

Ten grams of the hydroxamic acid sodium salt prepared in Example XI(A) were placed in 1000 ml. of 360 p.p.m. hardness water. This water contained both calcium and magnesium ions. After ten minutes the mix was filtered and 50 ml. of the filtrate was tested for hardness. The hardness of the water dropped to 42 p.p.m.

EXAMPLE XIII

Aluminum salts

A sample of the hydroxamic acid sodium salt prepared in Example XI(A) was immersed in a solution of aluminum sulfate. After one hour, the solution was filtered off and the solid, which was the hydroxamic acid aluminum salt, was washed with water. The solid was then suspended in a hydrochloric acid solution at a pH of 4 to disrupt the hydroxamic acid aluminum salt. The freed polyhydroxamic acid was filtered off. The filtrate was then made alkaline with ammonia whereupon a copious flocculent white precipitate of aluminum hydroxide formed. This demonstrated that the sodium salt form of the polyhydroxamic acid exchanged aluminum ions for sodium; the aluminum ions in turn being replaced by hydrogen ions upon regeneration with acid.

When using our polyhydroxamic acids as chelators or as ion exchangers, they can be used in the form of granules, fibers, yarns, woven, and nonwoven fabrics and the like. We prefer fabrics because they are self-supporting structures. They may take the form of a filter cloth in any geometrical form, e.g., rectangular or circular; they may be mounted upon a frame or be formed into a sleeve or sack of any size or shape. Also, when using our polyhydroxamic acids as chelators and ion exchangers, the processes of chelation and ion exchange can be batchwise or continuous.

It should be understood, however, that when carrying out the processes of chelation and ion exchange with polyhydroxamic acids, said processes are not limited to polyhydroxamic acids prepared by the novel method disclosed herein. On the contrary, in carrying out processes of chelation and ion exchange, we can use polyhydroxamic acids regardless of the manner of their preparation.

Having described our invention, what we claim as new and desire to secure by Letters Patent is:

1. A process for preparing a polyhydroxamic acid comprising hydrolyzing the reaction product of hydroxylamine and a high molecular weight nitrile containing polymer selected from the group consisting of
   polymers of acrylonitrile,
   polymers of α-methacrylonitrile,
   polymers of α-ethacrylonitrile,
   polymers of fumaryl dinitrile,
   polymers of vinylidene cyanide, and
   cyanoethylated polyvinyl alcohol,
at temperatures not exceeding 35° C. with an aqueous solution of hydrochloric acid containing from about 15% to about 37% by weight of hydrochloric acid.

2. The process of claim 1 in which said polymer of acrylonitrile is a homopolymer of acrylonitrile.

3. The process of claim 1 in which said polymer of acrylonitrile is a copolymer of acrylonitrile and at least one other ethylenically unsaturated monomer copolymerizable therewith.

References Cited

UNITED STATES PATENTS 2,772,281   11/1956   Holly _____ 260—307.3

FOREIGN PATENTS 560,782   3/1958   Belgium.

WILLIAM H. SHORT, *Primary Examiner.*

HAROLD N. BURSTEIN, *Examiner.*

J. C. MARTIN, C. A. WENDEL, *Assistant Examiners.*